Aug. 15, 1961  S. M. SILVER  2,996,224
METERED DISPENSING CARTON FOR SEMI-FREE-FLOWING AND FREE
FLOWING COMMINUTED AND GRANULAR SOLIDS
Filed May 19, 1958  2 Sheets-Sheet 1
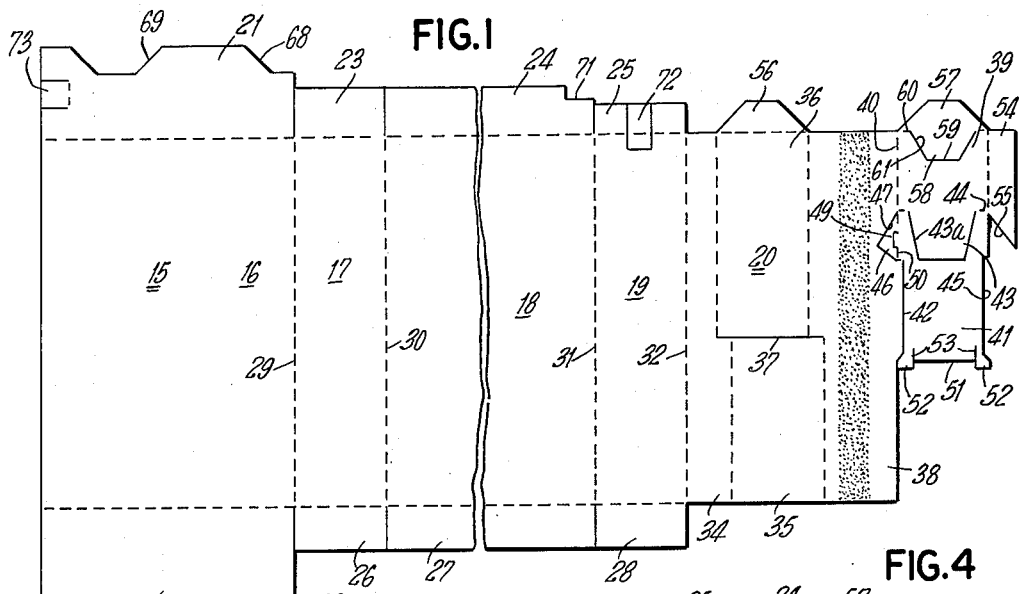
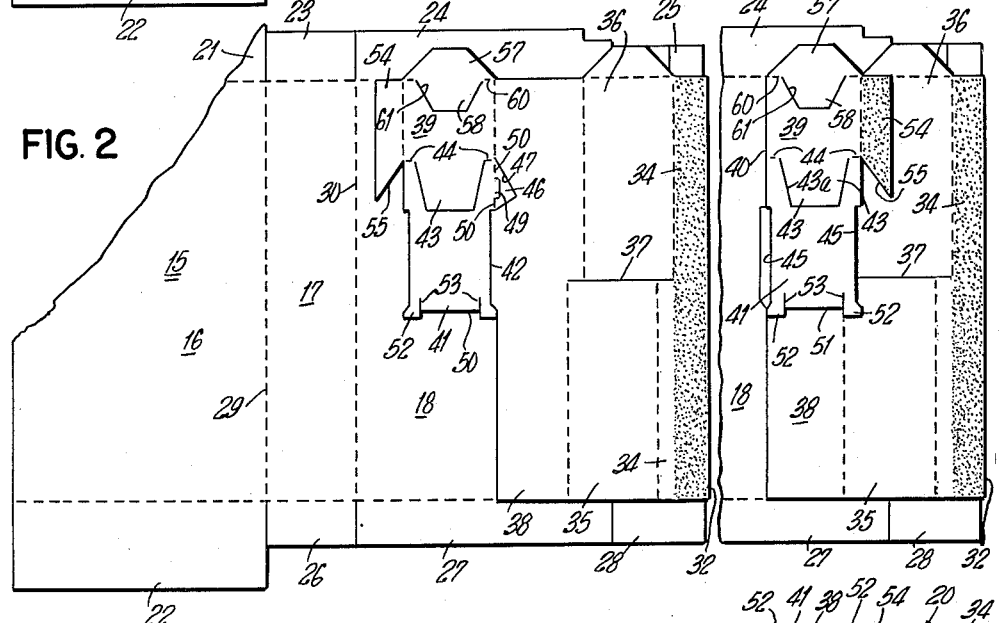
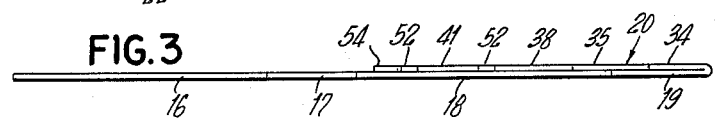
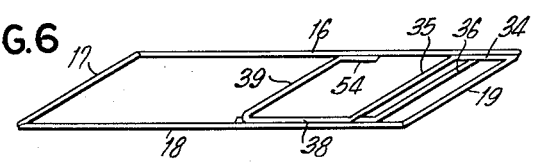
INVENTOR.
STAN M. SILVER Aug. 15, 1961  S. M. SILVER  2,996,224
METERED DISPENSING CARTON FOR SEMI-FREE-FLOWING AND FREE
FLOWING COMMINUTED AND GRANULAR SOLIDS
Filed May 19, 1958  2 Sheets-Sheet 2
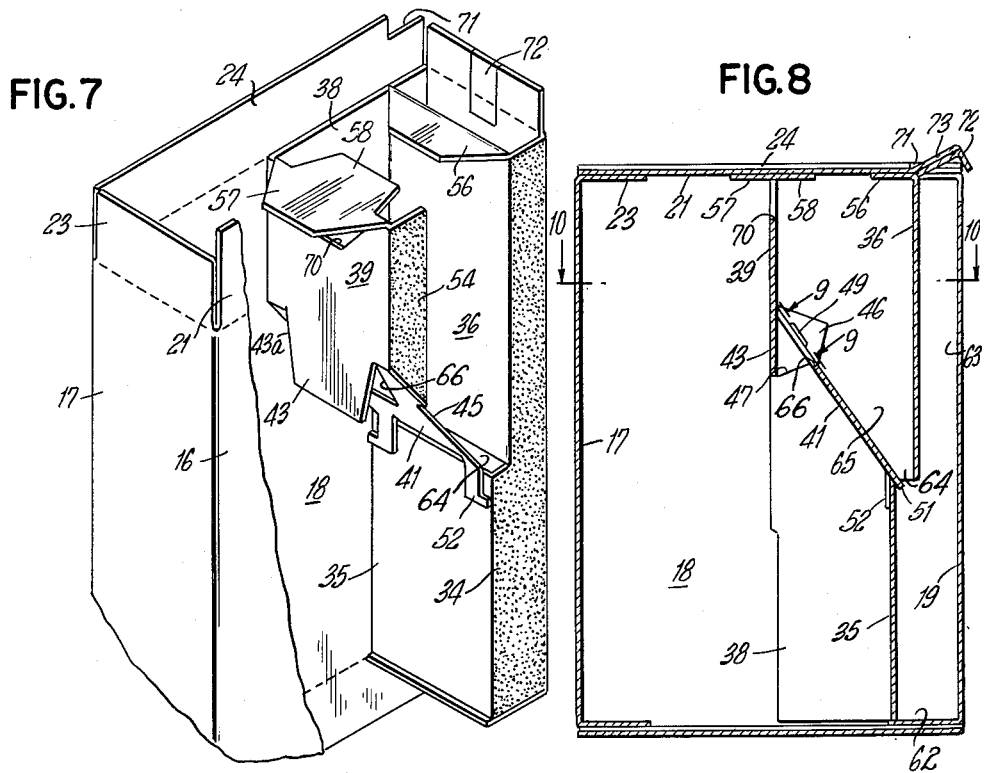
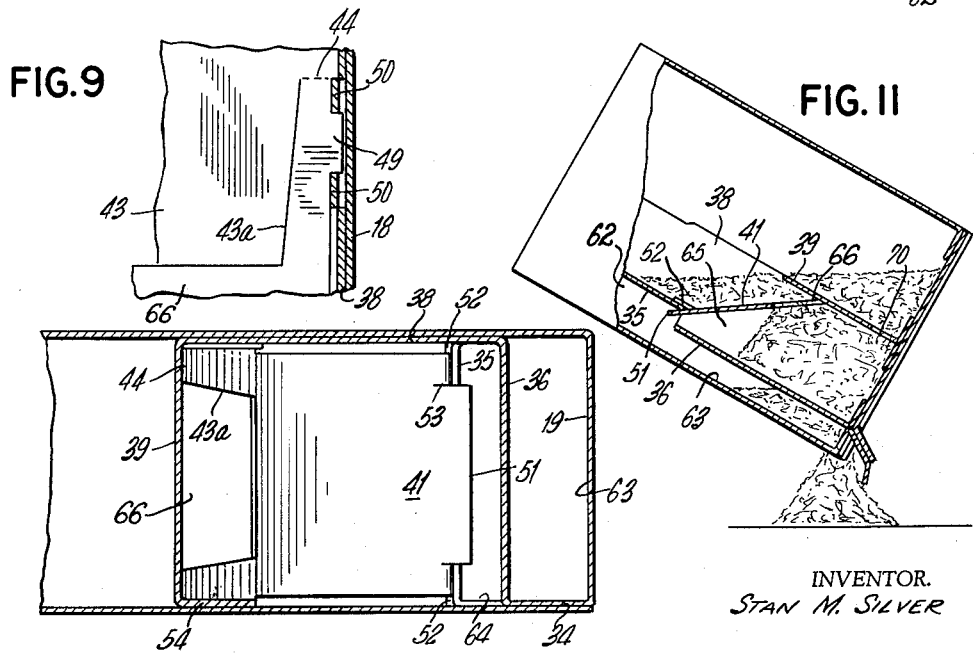
INVENTOR.
STAN M. SILVER

# United States Patent Office 2,996,224
Patented Aug. 15, 1961

2,996,224
METERED DISPENSING CARTON FOR SEMI-FREE-FLOWING AND FREE FLOWING COMMINUTED AND GRANULAR SOLIDS
Stan M. Silver, 25 Central Park West, New York, N.Y.
Filed May 19, 1958, Ser. No. 736,379
21 Claims. (Cl. 222—455)

The present invention relates to a carton, or the like, for dispensing evenly-metered quantities of its contents, both, free-flowing and semi-free-flowing comminuted solids, upon each dispensing use, and is an extension of my invention described and claimed in U.S. Patent No. 2,801,033, granted to me July 30, 1957, and of my invention described and claimed in my co-pending application Serial No. 635,413, filed January 22, 1957, now U.S. Patent No. 2,956,712.

In my said patent and said co-pending application, I have described and claimed, respectively, a two-piece and a one-piece carton, or the like, for dispensing metered amounts of free-flowing granulated materials. In both said inventions, I have described a carton having a partition which folds flat and which sets up with the carton to divide the same into four compartments. These four compartments include an outlet chute along one wall; an open-top metering chamber of greater capacity than the outlet chute disposed along the same wall below the outlet chute, communicating with it and extending inwardly beyond it; and a supply or feeding chamber from which granulated material is fed into the metering chamber and of greater capacity than the latter, disposed alongside of said chute with a portion thereof overlying a part of the open top of the metering chamber; such supply chamber having a bottom wall all or part of which is hinged for movement into the supply chamber, with its free end engaging the edge of the metering chamber to form a trap or one-way valve which permits the flow of granulated material from the remainder or storage part of the carton into the supply chamber, upon inversion of the carton for dispensing purposes.

The present invention is directed to a metered dispensing carton of the same general type as described above; but which is particularly adapted for the dispensing of semi-free-flowing materials, such as highly comminuted, powdered or floury material of the type which tends to pack and flows only upon more or less active agitation, though it is also suitable for use with free-flowing material.

It is the object of the present invention to provide such metered dispensing cartons for semi-free-flowing material, which has all of the advantages and attains all of the objects of the inventions of my said patent and my said co-pending application; to wit, that it may be made of a suitably cut and scored one-piece cardboard blank, which may be glued and folded flat on a conventional straight-line gluing and folding machine and set up and unfolded by conventional equipment at standard rates of speed; is sturdy; is efficient for its purposes; is accurate in its measurements from first to last; is easy and convenient to use; and is relatively economical to produce.

The foregoing and other objects and advantages of the metered dispensing carton of the present invention will become more readily apparent to those skilled in the art from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

In the drawings:

FIG. 1 is a foreshortened plan view of a cardboard blank for forming the metered dispensing carton of the present invention;

FIG. 2 is a fragmentary plan view of the blank of FIG. 1, shown after it is partly folded and glued;

FIG. 3 is an edge view of the partly-folded and glued blank of FIG. 2;

FIG. 4 is a fragmentary plan view of the cardboard blank after a further step of folding and gluing;

FIG. 5 is an edge view of the partly-folded and glued blank shown in FIG. 4;

FIG. 6 is an edge view of the fully-folded and glued blank of FIGS. 1–5; in partly unfolded and set-up position;

FIG. 7 is a fragmentary perspective view of the fully set-up carton blank, before sealing its top; with one of the walls partly broken away to show the interior details;

FIG. 8 is a vertical section through the set-up and fully closed carton;

FIG. 9 is a section taken on line 9—9 of FIG. 8;

FIG. 10 is a section taken on line 10—10 of FIG. 8; and

FIG. 11 is a view, on a reduced scale, partly in section, showing the carton in dispensing position.

Generally stated, the present invention consists in the provision within the carton of means for initiating the flow of the comminuted material between the supply chamber and the storage compartment by the slight movement of the carton ensuing upon the handling thereof, to overcome the tendency of the material to pack, so as to initiate its free flow from the supply chamber to the metering chamber. To this end, the carton of my previous invention has been modified to facilitate and stimulate the movement of material from the supply compartment to the metering chamber by providing the latter with a fixed, sloping bottom wall that is somewhat spaced from the side walls of the carton to permit initiating the flow of material past it, and, in replacement of the bottom valve trap, to provide a top feed for the supply chamber. With these main features of the invention in mind, the illustrated embodiment thereof, shown in the accompanying drawings, will now be described in detail.

Such embodiment of the invention comprises a cardboard blank, generally designated as 15, preferably cut along the length of a strip of cardboard such as generally used for the purpose, which is lined with a smooth paper liner on its outer surface, so that the grain of the cardboard runs with the width of the blank 15. The blank 15 is cut and scored to provide four upright walls generally required for a carton, including an outer side wall section, 16, and inner end wall section, 17, an inner side wall section, 18, and an outer end wall section, 19. The blank 15 is also provided with an integral, infolding extension, generally designated as 20, on the outer edge of the outer end wall section 19; such extension 20 constituting the partitioning means of the carton.

The outer side wall section 16 is formed with a top wall-forming flap or extension, 21, at its outer edge, of an over-all height substantially equal to the projected width of the carton, and at its bottom edge with an integral bottom wall-forming extension, 22, of the same height. The inner end wall section 17, the inner side wall section 18, and the outer end wall section 19 are each provided at their respective top and bottom edges with an infolding top wall-forming extension, 23, 24 and 25, respectively; and a bottom wall-forming extension, 26, 27 and 28, respectively.

The top wall-forming extensions 23 and 24 are each of a height approximately half the projected width of the carton, while the top wall-forming extension 25 of the outer end wall section 19 is of reduced height, as is the adjacent portion of the extension 24, for purposes which will hereafter be explained. The bottom wall-forming extensions 26, 27 and 28 are each of a height substantially equal to half the height of the bottom wall-forming extension 22.

Wall sections 16, 17, 18 and 19 are defined from one another by the respective fold lines, 29, 30 and 31, and the outer end wall 19 is defined from the extension 20 by fold line 32. The top and bottom extensions of the several wall sections are defined from such wall sections by suitably scored fold lines, and are separated from one another by cut lines, in the conventional manner.

The infolding extension 20 is generally co-extensive in height with the adjacent side and end wall sections 16 to 19, and is divided by suitable, vertically extending scored fold lines into the gluing strip, 34, immediately adjacent the fold line 32, which has a wider lower portion; a lower panel 35, substantially equal in width to the projected width of the carton, immediately adjacent the wider portion of the gluing strip, 34; an upper panel 36, of the same width as the panel 35, immediately adjacent to the narrower upper part of the gluing strip 34, so that it is offset toward the end wall 19 relative to the lower panel 35. The panels 35 and 36 are separated from one another by a cut line, 37, extending their combined widths. Section 20 has, adjacent panels 35 and 36, a second gluing strip, 38, of substantially greater width than gluing strip 34, and having a wider upper portion alongside of panel 36 and a narrower lower portion; and, alongside the upper portion of gluing strip 38, with a panel, 39.

The panel 39 is formed with a lower extension, 41, that is separated from the adjacent gluing strip 38 by the cut line, 42, and has a tongue extension, 43, of lesser width, cut out from the adjacent upper portion of the extension 41, by U-shaped cut line 43a. The extension 41 is defined from the panel 39, by the fold lines 44, to each side of tongue 43, forming hinges along which it may be offset relative to panel 39 to leave an opening at its top, for purposes which will hereafter be described. Extension 41 may have narrow, elongated indentations, 45, along its longitudinal edges, extending from adjacent its bottom edge to a point spaced from its hinges 44, for a purpose explained hereafter.

Cut line 42 may preferably have its upper end portion above the adjacent indentation 45, extended outwardly into the gluing strip 38, to provide a triangular dart extension, 46, on the upper inner edge portion of the extension 41, cut away from gluing strip 38, to leave an opening, 47, therein. Such dart 46 may have a narrow lug, 49, cut away from its inner edge and may be defined from the extension 41 by scored fold lines, 50, to each side of said lug 49; lug 49 remaining in rigid association with the extension 41, when the dart 46 is folded or offset along fold lines 50.

The extension 41 is of such length that its bottom edge, 51, is disposed below the cut line 37 separating the panels 35 and 36, and is provided at each of its bottom corners with a depending lug or foot, 52, each of which extends laterally to render the bottom of the extension 41 of equal width with the panel 39 or, to state it in other words, with the projected width of the carton. Each foot, 52, may have an upper leg portion extending into the body of the panel extension 41, formed by the short, upwardly extending cut lines, 53, which make possible offsetting of the feet 52 from the bottom edge portion of the extension 41.

The panel 39 is provided along its outer edge, with a gluing tab, 54, defined therefrom by a scored fold line and having a downwardly and outwardly extending edge, 55, tapering to a point.

The panel 36 may be provided at its upper end with an infolding flap, 56, preferably having upwardly converging side edges. Similarly, the panel 39 is provided at its upper edges with a folding flap, 57, likewise having, preferably, upwardly converging edges. The flap 57 is provided with a depending tongue, 58, of lesser width, which is cut away from the upper portion of the panel 39 by the substantially U-shaped cut line, 59, the ends of which terminate short of the edges of the panel 39 to leave hinges, 60, formed by suitably scored fold lines. The flap 57 and tongue 58 will pivot into horizontally offset position, relative to the panel 39, upon hinges 60, as hereafter explained, to leave a cut-out opening, 61, in the upper end of the panel 39, said flap and tongue extension remaining secured to the upper edge of the panel 39 by the scored hinges 60.

The blank 15 may be folded, glued and set up as follows. A line of glue is first applied to the inner, or rough, unlined face of the gluing panel 38, leaving the triangular dart 46 uncoated. The extension 20 is then folded, along fold line 32, over the adjacent end and side walls 18 and 19, respectively, so as to bring about the adhesion of gluing panel 38 to the inner face of the inner side of wall 18 in spaced relation from the fold line 31; such spacing being equal to the width of the gluing strip 34. The panel 39 is then reversely folded, along fold line 40, over the adjacent gluing strip 38, and lines of gluing applied, preferably simultaneously, to gluing strip 34 and gluing tab 51. The outer side wall and inner end walls, 16 and 17, respectively, are then folded over, along the fold line 30, to have the inner face of outer side wall 16 glued to the gluing tab 51 and gluing strip 34. These operations are indicated in FIGS. 2 to 6 of the drawing.

This gluing and folding of the carton blank 15 will also fold the triangular dart 46 along fold lines 50, against the adjacent portion of the panel extension 41, thereby tending to stretch or "educate" the fibers of the paper board along that portion of the fold line 50 to maintain the tab 46 at least partly folded away from the gluing strip 38 when the carton is set up into squared shape by pressure along the opposed edges of the folded blank as shown in FIG. 6. The pressing of the glued and folded blank into squared shape will create a metering chamber, 62, between the panel 35 and the lower portion of the parallel end wall 19, and a narrower outlet chute, 63, between the panel 36 and the adjacent portion of end wall 19, immediately above and opening into and overlying part of the metering chamber 62, along the opening, 64, thereinto formed by the cut line 37. This squaring of the glued and folded blank will also set up the panel 39 in spaced parallel relation to the panel 36, to define an inner wall portion of a third compartment, 65.

The extension 41 of panel 39 is then bent, along hinges 44, by suitable and relatively simple means, as by an automatically-actuated plunger or by a blast of compressed air, in the direction of panel 36 until its bottom edge portion 51 passes the upper edge of the panel 35 and partly overlies the opening 64 created by the offsetting of panels 35 and 36. Because of their greater length, the feet 52 will remain on the exterior of the panel 35, the upper edge of which is held in the cuts 53 to thereby safely anchor the free end of the extension 41, which then forms the bottom wall for the supply compartment 65, which opens at its lowest point into the metering chamber 62. It may here be stated that the width of the panel 38 and the length of extension 41 are such that the volume of the triangular portion of the compartment 65 is greater than that of the metering chamber 62 and forms a supply chamber therefor.

It will be readily apparent that the bending of or offsetting of the panel extension 41 will space its upper end from the tongue 43 to provide the opening 66, at the top of the supply portion of compartment 65. It will also be clear that as the extension 41 is bent towards the panel 35, the lug 49 will impinge against the edge of the opening 47 left in the gluing strip 38 when the dart 46 is folded away from such gluing strip upon the squaring of the glued blank, due to the stretching of the fibers at this point or junction, as explained above.

This engagement of the tab 49 against the edge of the opening 47 inhibits any inward movement of the extension 41 under the weight of the material that may be placed thereon in the course of dispensing.

It will also be clear that the supply chamber portion of compartment 65 will have spaces along each edge of its bottom wall 41 to permit seepage of material therethrough at a relatively slow rate, for purposes which will hereafter be more fully explained.

After the glued and folded blank is pressed into squared position, the upper flaps 23 and 25 are infolded, and the flap 21 infolded and secured on top of them. This flap 21 will cover the entire top of the carton except for the cutouts, 68 and 69, left by the flaps 56 and 57, respectively, of an adjacent blank 15, which may be cut out in reversed nested relation with the blank shown, to thereby eliminate waste; such cut-outs 68 and 69, being of a depth less than half the width of flap 21. Thereafter, flap 24 is folded over and adhesively secured over flap 21. It will be clear that as such top flaps are infolded, they will infold the flap 56 at the top of panel 36 and also flap 57 at the top of panel 39; the latter will be tilted into lateral position along the hinges 60, so that its tongue 58 will move out of the panel 39 to provide an opening, 70, therethrough from the carton interior into the space between the panel 39 and the panel 36.

After the top wall of the carton has been formed and the supply compartment 65 provided by the bending of the extension 41, the carton may be placed with its top wall down on a conveyor of a filling machine and filled through its open bottom. The space between panel 36 and panel 39 being filled up through the openings 66 and 70 and through the spaces along the edges of the extension 41. After filling, the bottom wall of the carton may be completed by the infolding and gluing of the several bottom wall flaps 28, 27, 26 and 22.

An outlet opening for the carton, which is of lesser area width than the cross section of the outlet chute 63, may be provided, preferably in the top wall above the outlet chute. For that purpose, the corner of the flap 24 immediately adjacent and overlying the flap 25 may be cut away, as at 71, and a tear-away portion, 72, defined in the center of the flap 25 extending a short distance into the end panel 19 immediately below it, and a corresponding and registering tear-away portion, 73, may be defined in the flap 21, in the portion thereof overlying the tear-away 72 provided in the flap 25.

The dispensing operation of the carton may now be explained. After the filling of the carton, all of its compartments are substantially filled, except for the conventional unfilled space at the top of the carton. The ordinary handling of the carton from the place of filling to the consumer will create a backflow from the supply chamber into the carton and from the metering chamber into the supply chamber, until the outlet chute is emptied, as explained in my said co-pending application, Serial No. 635,413, now U.S. Patent No. 2,956,712. Thus, when the initial dispensing is done, by the inversion of the carton, only the material in the metering chamber will be dispensed. As explained in my said co-pending application, no transfer of material between the supply chamber and metering chamber takes place in the course of the inversion, because the communicating opening between them is blocked by the material in the two of them.

Upon the completion of the dispensing, the carton is uprighted again. Such movement of the carton that is required for the purposes of uprighting it will start a slight seepage of material through the spaces alongside of the extension 41 and at its end, and also through the opening 66 to give an initial start to and stimulate the movement of even powdered material which tends to pack under its own weight, to start its movement downwardly along the extension 41 into the metering chamber 62; the material continuing to flow under the stimulus of the initial start until the metering chamber is filled and the opening between it and the supply chamber is blocked by the material. After the next dispensing inversion of the carton, and its subsequent uprighting, the supply portion of chamber 64 which is emptied to a greater part by the previous dispensing, or rather the upper portion of chamber 65, is filled, through openings 64 and 70, by additional material from the storage compartment, which material, upon the uprighting of the carton, drops down into the triangular supply portion of chamber 65.

This completes the description of the metered dispensing carton for both free-flowing and semi-free-flowing solids of the present invention. It will be readily apparent that it is highly effective and efficient for the metered dispensing of free-flowing as well as semi-free-flowing comminuted solids; is of relatively simple construction; is capable of being glued, folded and filled in the conventional manner, upon and by conventional equipment, at a rate of speed no different from conventional cartons. It will also be apparent that the cartons of the invention may be relatively economically produced and are easy and convenient to use, with great advantages to the consumer.

It will be further apparent that numerous modifications and variations may be made in the metered dispensing carton of the present invention, in accordance with the principles of the invention hereinabove set forth, and without the exercise of any inventive ingenuity. I desire, therefore, to be protected for any and all such modifications and variations that may be made within the spirit of the invention and the scope of the claims hereto appended.

What I claim is:

1. A metered dispensing container of the character described, comprising a receptacle having top and bottom walls and a connecting upright wall, said receptacle having an outlet opening defined in the upper portion thereof, adjacent the junction of said top wall with said upright wall, and partition means within said receptacle, dividing the interior thereof into a plurality of compartments, including an outlet chute extending below said defined outlet opening, a metering chamber immediately below said outlet chute and continuous therewith, said metering chamber being of greater cross-section than said chute and extending inwardly therefrom into the receptacle, a storage chamber, and a supply chamber, said supply chamber located alongside said chute and above said metering chamber, said supply chamber including an inner wall of lesser height than said chute, side walls and a bottom wall sloping inwardly and upwardly from the upper edge of said metering chamber to the lower edge of said inner wall between said side walls, said bottom wall having relatively narrow cut-away portions formed therein to provide seepage openings between said supply chamber and said storage compartment, and relatively large openings provided in the wall portions of said supply chamber for the flow of material from said storage chamber into said supply chamber.

2. The container of claim 1, wherein the portion of said supply chamber between its lowest point and the inlet opening thereinto closest to said lowest point is of greater capacity than said metering chamber.

3. The container of claim 1, wherein said upright connecting wall comprises opposed side and end wall sections and wherein said partition means defining said compartments therewithin include panel sections disposed between said side walls in parallel relation to an end wall thereof.

4. The container of claim 1, wherein inlet openings into said supply chamber are provided at the upper end of said bottom wall and at the upper end of said inner wall thereof.

5. A metered dispensing container comprising a receptacle having top and bottom walls and a connecting upright wall, said receptacle having an outlet opening defined in the upper portion thereof adjacent the junction of said top wall with said upright wall, and partition means integral with an upright edge of said upright wall inwardly folded and dividing the interior of said receptacle into a plurality of compartments, including a metering chamber alongside of said upright wall below said outlet opening, said metering chamber having an open top, an outlet chute above said metering chamber, communicating with said outlet opening and with the open top of said metering chamber, and a supply chamber alongside of said outlet chute and communicating with the open top of said metering chamber, said supply chamber including an inner wall portion, side walls, and a bottom wall, said inner wall being of lesser height than said outlet chute and disposed in an upper part of said receptacle, said bottom wall disposed between said side walls and extending inwardly and upwardly from the upper edge of said metering chamber to the lower edge of said inner wall, said bottom wall having cut-away portions forming seepage openings between said supply chamber and the interior of said receptacle, inlet means provided in the said partition for the passage of material from the exterior into the interior of said supply chamber at a point removed from the lower end of said bottom wall.

6. The metered dispensing container of claim 5, wherein an inlet opening into the supply chamber is formed along the upper end of said inner wall.

7. The metered dispensing container of claim 5, wherein an opening for said supply chamber is formed at the upper end of said bottom wall.

8. The metered dispensing container of claim 5, wherein means, integral with said inwardly folded partition, are provided for inhibiting the movement of the bottom wall inwardly into said supply chamber.

9. The metered dispensing container of claim 5, wherein said upright connecting wall comprises opposed side and end walls and wherein said outlet opening is formed adjacent the intersection of one of said walls with said top wall and said partition means are integral with the adjacent upright edge portions of an adjacent wall and are inwardly folded to form said compartments in parallel relation to said first-named wall intermediate the adjacent opposed walls.

10. A metered dispensing carton comprising top and bottom walls and opposed side and end walls connecting said top and bottom walls, an opening defined in said carton adjacent the junction of one of said end walls with said top walls and an integral extension of an adjacent side wall, inwardly folded into said carton and partitioning the interior thereof to form a metering chamber alongside of and parallel to said end wall at its junction with said bottom wall, said metering chamber extending between the adjacent side walls and having an open top; an outlet chute extending alongside said end wall between said side walls above said metering chamber, said outlet chute having an open bottom communicating with the open top of said metering chamber and a supply chamber alongside and inwardly of said outlet chute above and communicating with the open top of said metering chamber, said supply chamber having an upper inner wall parallel to said end wall and of lesser height than said supply chamber, and extending between said side walls and secured thereto, and a bottom wall extending from the lower edge of said inner wall and sloping downwardly to the upper edge of said metering chamber; relatively narrow openings formed in said bottom wall for the seepage of material in and out of said supply chamber therethrough, and relatively larger openings formed in said extension for the free flow of material in and out of said supply chamber.

11. The metering container of claim 10, wherein said bottom wall engages over the upper edge of said metering chamber and extends partly thereinto.

12. A blank for a metered dispensing carton of the character described comprising a cardboard section cut and scored to define alternating side and end walls, each having foldable top and bottom flaps, one of said end walls having an extension along its outer edge, said extension cut and scored to define a gluing strip immediately adjacent said end wall and having a lower portion of greater width than the upper portion thereof, a panel of equal width with an end wall adjacent each of the upper and lower portions of said gluing strip, said panels separated by a cut line extending their combined widths, a second gluing strip of greater width than said first gluing strip immediately adjacent said panels, a panel of equal width with said end wall connected to the upper portion of said second gluing strip, said last-named panel having a lower extension of lesser width hinged thereto, said extension of a length to extend from the lower edge of said last-named panel to the upper edge of the lower of said first-named pair of panels when said panels are folded into spaced parallel relation to one another, said last-named panel having a gluing strip at its outer edge.

13. The carton blank of claim 12, wherein said extension is defined from said last-named panel by a scored fold-line and is defined from said last-named gluing strip by a cut-line, the upper end of said cut line having an angular indentation to form a laterally extending dart at the upper inner edge of said extension, said extension having an integral lug extending into and cut away from said dart, said dart defined from said extension by a scored fold line for folding against said extension.

14. The carton blank of claim 12, wherein said extension is defined from said last-named panel by a scored fold line and is defined from said last-named gluing strip by a cut line, the upper end of said cut line having an angular indentation to form a laterally extending dart at the upper inner edge of said extension, said extension having an integral lug extending into and cut away from said dart, said dart defined from said extension by a scored fold line for folding against said extension, and wherein said panel is formed with a tongue at its lower end, said tongue cut away from the upper end of said extension, said tongue adapted to leave an opening in said extension when said extension is offset relative to said panel along said fold line, defining them from one another.

15. The carton blank of claim 12, wherein said last-named panel is provided with a flap extension on its upper edge, said flap extension having a tongue of lesser width, integral with its bottom edge, said tongue cut out from the upper portion of said last-named panel, said flap extension defined from said last-named panel by scored fold lines to each side of the tongue thereof.

16. The carton blank of claim 12, wherein said extension is defined from said last-named panel by a scored fold line and is defined from said last-named gluing strip by a cut line, the upper end of said cut line having an angular indentation to form a laterally extending triangular dart at the upper inner edge of said extension, said extension having an integral lug extending into and cut away from said dart, said dart defined from said extension by a scored fold line to each side of said lug for folding against said extension, and wherein said last-named panel is formed with a tongue at its lower end, said tongue cut away from the upper end of said extension, said tongue adapted to leave an opening in said extension when said extension is offset relative to said panel, and is provided with a flap extension on its upper edge, said flap extension having a tongue of lesser width, integral with its bottom edge, said last-named tongue cut out from the upper portion of said last-named panel, said flap extension defined from said last-named panel by scored fold lines to each side of the tongue thereof.

17. The carton blank of claim 12, wherein said panel extension extends below said cut line separating said first pair of panels, and is of a length greater than the length of a diagonal line extending from the upper inner corner of said extension to the junction between the outer edge of said upper panel and the cut line separating it from said lower panel, and wherein said extension is provided with at least one downwardly extending leg along its bottom edge, said lug extension having a cut line extending from its inner end upwardly into said panel extension.

18. A metered dispensing container, comprising a receptacle having top and bottom walls and a connecting upright wall, said receptacle having an outlet opening defined in an upper portion thereof adjacent the junction of said top wall with said upright wall, and partition means within said receptacle dividing the interior thereof into a plurality of compartments, including an open top metering chamber in a lower portion of said receptacle, an outlet chute extending from said metering chamber to said outlet opening, said outlet chute overlying a portion of the open top of said metering chamber, and a supply chamber communicating with the other portion of the open top of said metering chamber, said supply chamber including a wall section extending diagonally upwardly from the edge of said metering chamber, and inlet means for the flow of material into said supply chamber.

19. A blank for a metered dispensing carton of the character described, comprising a section of cardboard cut and scored to define alternating side and end walls each having foldable top and bottom flaps, one of said end walls having an extension along its upright outer edge, said extension cut and scored to define a gluing strip immediately adjacent said end wall and having a lower portion of greater width than the upper portion thereof, a panel of equal width with an end wall adjacent each of said portions of said gluing strip, said panels separated by a cut line extending their combined widths, a second gluing strip of greater width than said gluing strip immediately adjacent said panels, and a panel of equal width with said end wall connected to said gluing strip.

20. A blank for a metered dispensing carton of the character described, comprising a section of cardboard cut and scored to define alternating side and end walls, each having foldable top and bottom flaps, one of said end walls having an extension along its upright outer edge, said extension cut and scored to define a gluing strip immediately adjacent said end wall and having a lower portion of greater width than the upper portion thereof, a panel of equal width with an end wall adjacent each of the upper and lower portions of said gluing strip, said panels separated by a cut line extending their combined widths, and a second gluing strip of greater width than said first gluing strip immediately adjacent said panels, a panel of equal width with said end wall connected to the said last named gluing strip and including a portion hinged thereto and extending from a point above the line dividing said first named panels and of a length slightly greater than the diagonal between said point to said cut line.

21. A blank for a metered dispensing carton, comprising a section of cardboard severed from a continuous cardboard strip and cut and scored to define alternating side and end walls with one of said side walls and one of said end walls forming terminals of said cardboard section each of said walls having top and bottom flaps foldable to define top and bottom walls for the carton, the flaps of the terminal of said side walls of said blank being of a height substantially equal to the width of an end wall and the flaps of the other of said walls being of a height substantially half the height of the flaps of said terminal side wall, the terminal one of said end walls having an extension along its upright outer edge, said extension cut and scored to define a spacing strip immediately adjacent said end wall, a panel of equal width with an end wall adjacent each of the upper and lower portions of said spacing strip, said panels separated by a slit, a second spacing strip adjacent said upper and lower panels to the other side thereof, a third panel of equal width with said end wall connected to the said second spacing strip, and a hinged extension at the lower edge of said third panel, said upper panel and said third panel each having a flap at its upper edge of a height not exceeding half the height of the flap of said terminal side wall, the upper flap of said terminal side wall having portions thereof cut away, forming the top flaps of the top and third panels of the contiguous blank to be cut from said cardboard strip.

References Cited in the file of this patent
UNITED STATES PATENTS

| | | |
|---|---|---|
| 1,931,270 | Rice | Oct. 17, 1933 |
| 2,801,034 | Silver | June 30, 1957 |
| 2,803,385 | Silver et al. | Aug. 20, 1957 |
| 2,853,213 | Bvehlig | Sept. 23, 1958 |